Feb. 13, 1940.  H. H. TALBOT  2,190,638

FLYING SHEAR

Filed Aug. 2, 1938  8 Sheets-Sheet 1

INVENTOR
Howard H. Talbot
BY
ATTORNEY

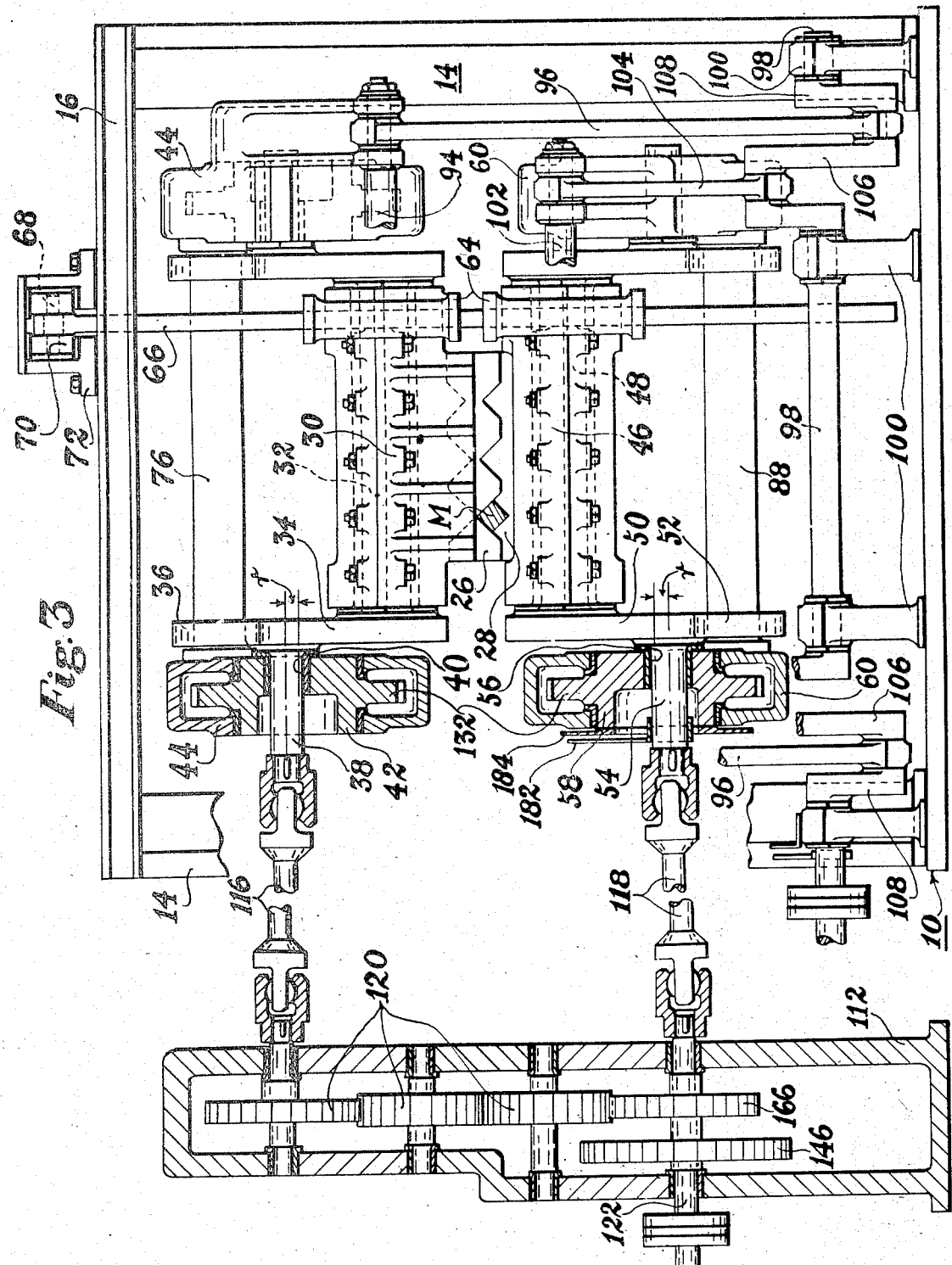

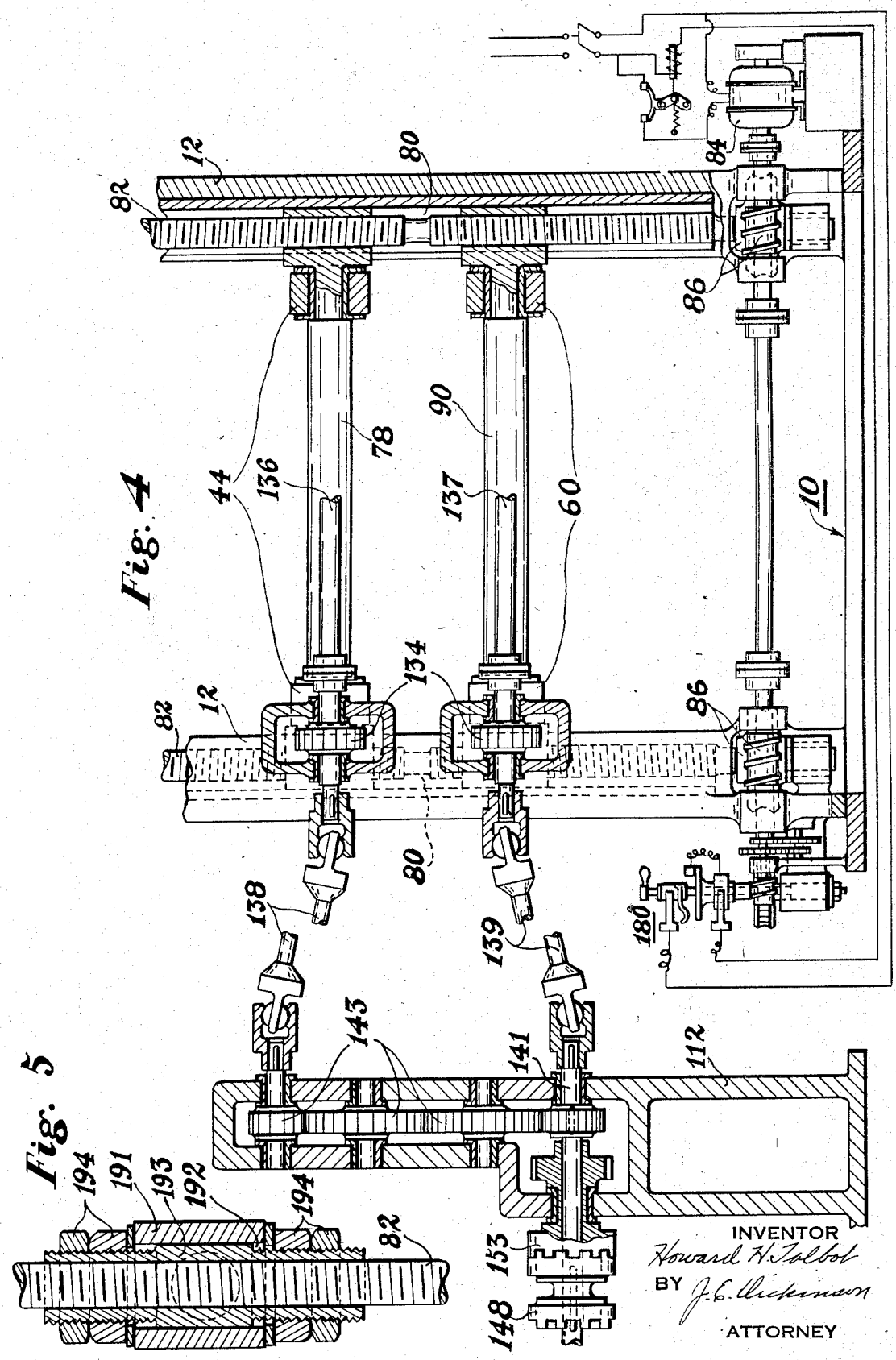

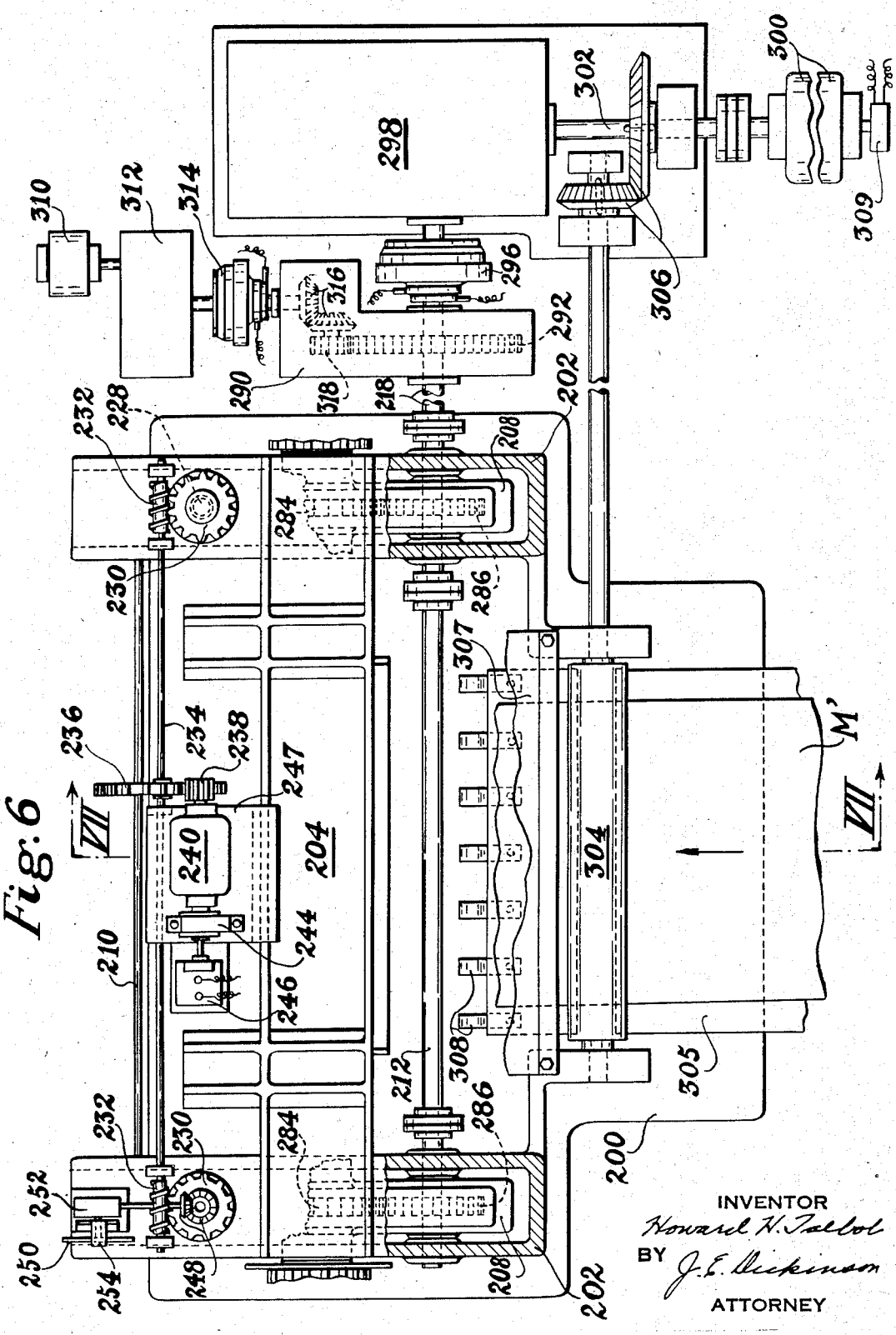

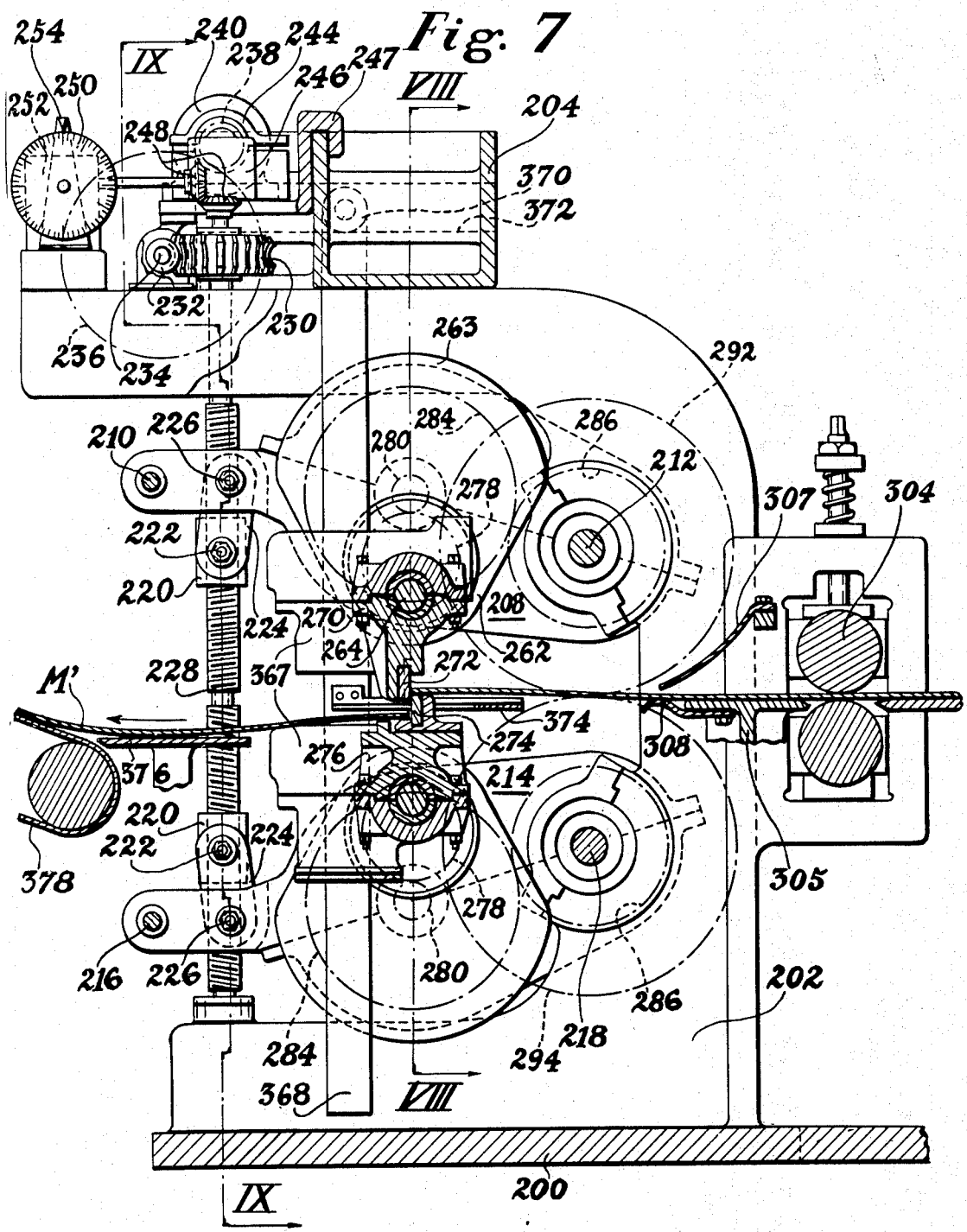

Feb. 13, 1940.　　　　　　H. H. TALBOT　　　　　　2,190,638
FLYING SHEAR
Filed Aug. 2, 1938　　　　8 Sheets-Sheet 8
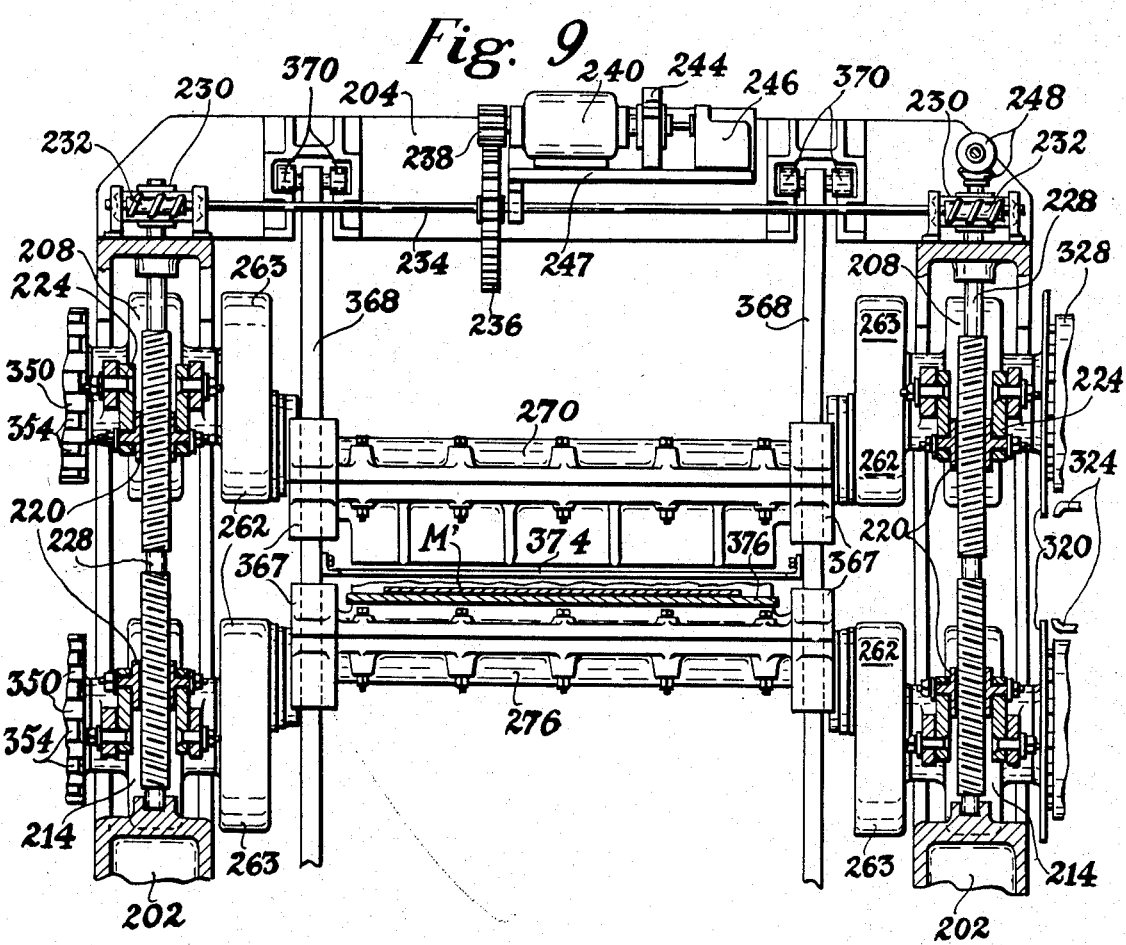
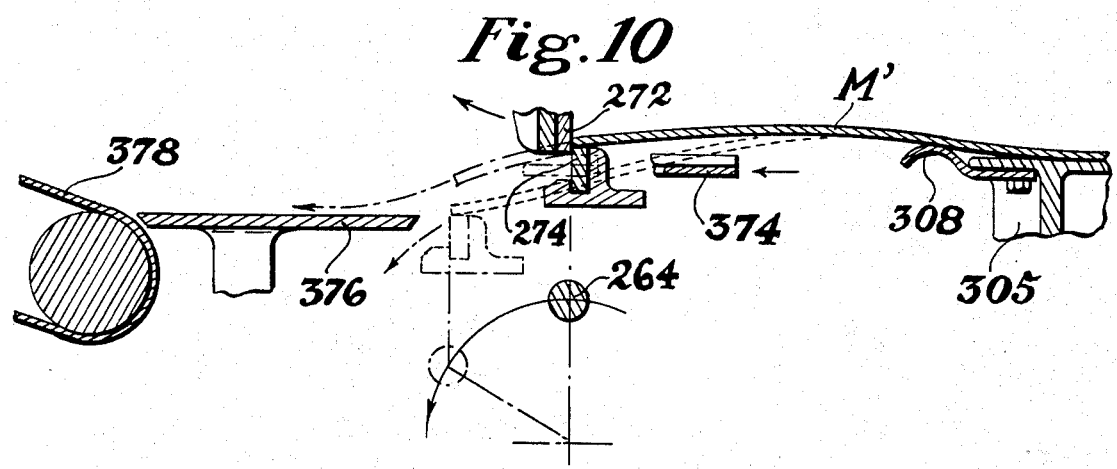
INVENTOR
Howard H. Talbot
BY J. E. Dickinson
ATTORNEY Patented Feb. 13, 1940

2,190,638

UNITED STATES PATENT OFFICE 2,190,638

FLYING SHEAR

Howard H. Talbot, Pittsburgh, Pa., assignor to United Engineering and Foundry Company, Pittsburgh, Pa., a corporation of Pennsylvania Application August 2, 1938, Serial No. 222,643

21 Claims. (Cl. 164—68)

This invention relates to apparatus, usually called flying shears, for cutting elongated material, such as billets, bars, rods, strips, sheets, and the like, into predetermined lengths while the material is in motion.

It is the general object of my invention to provide a relatively inexpensive, easily operated flying shear which is adapted to cut material moving at any of a comparatively wide variety of speeds into pieces of substantially any predetermined length.

Figure 1:
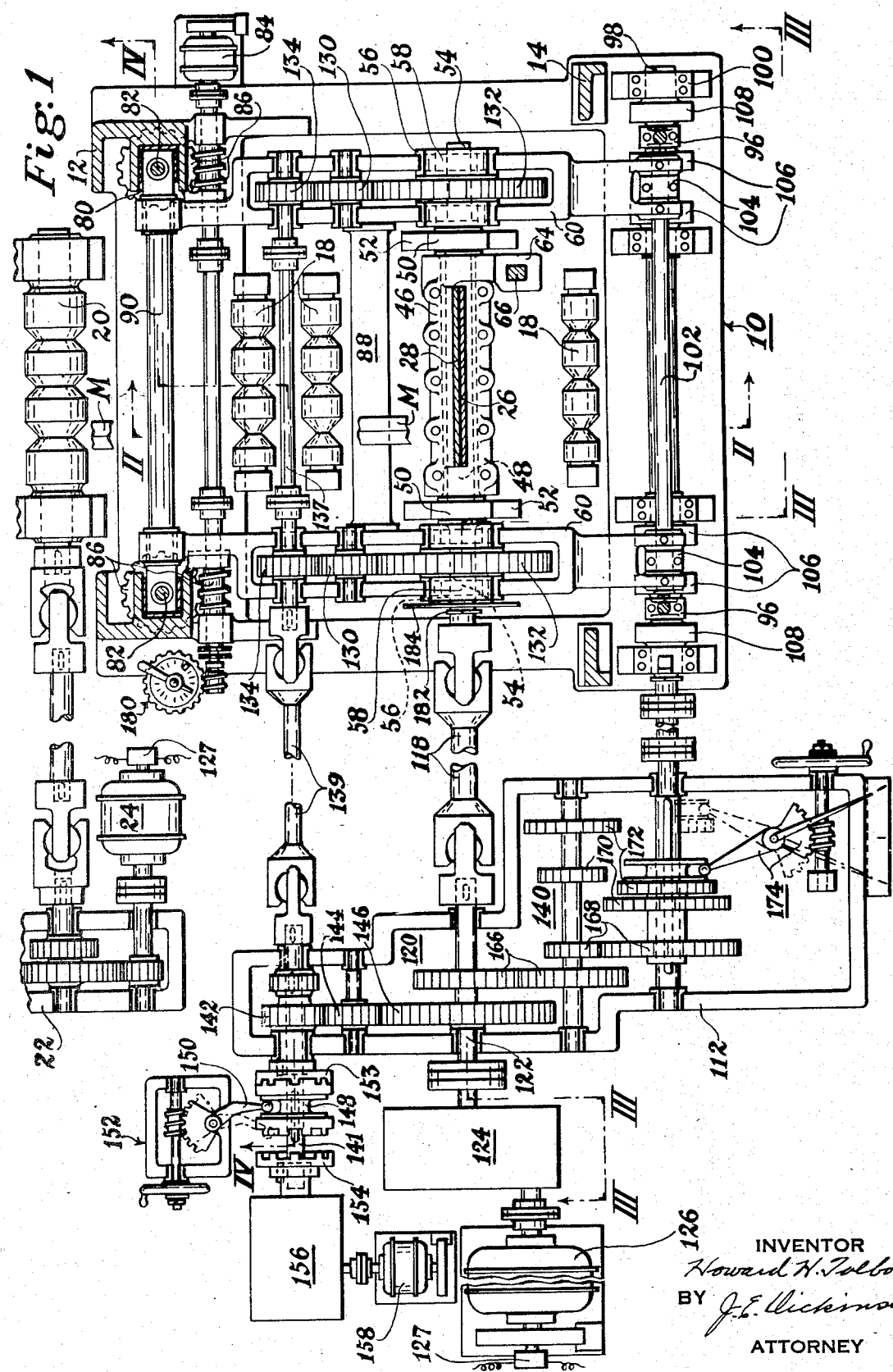
Figure 2:
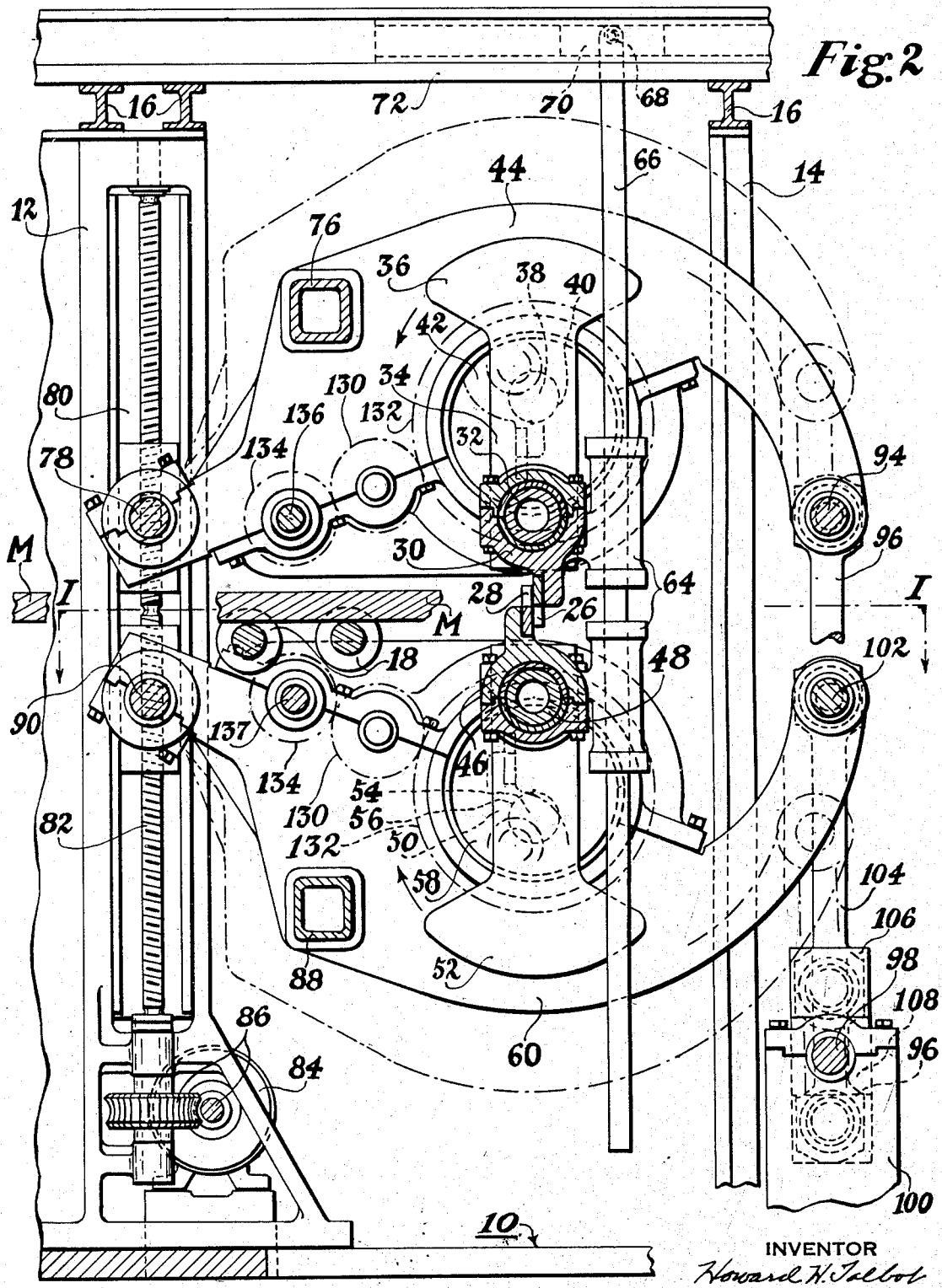
Figure 8:
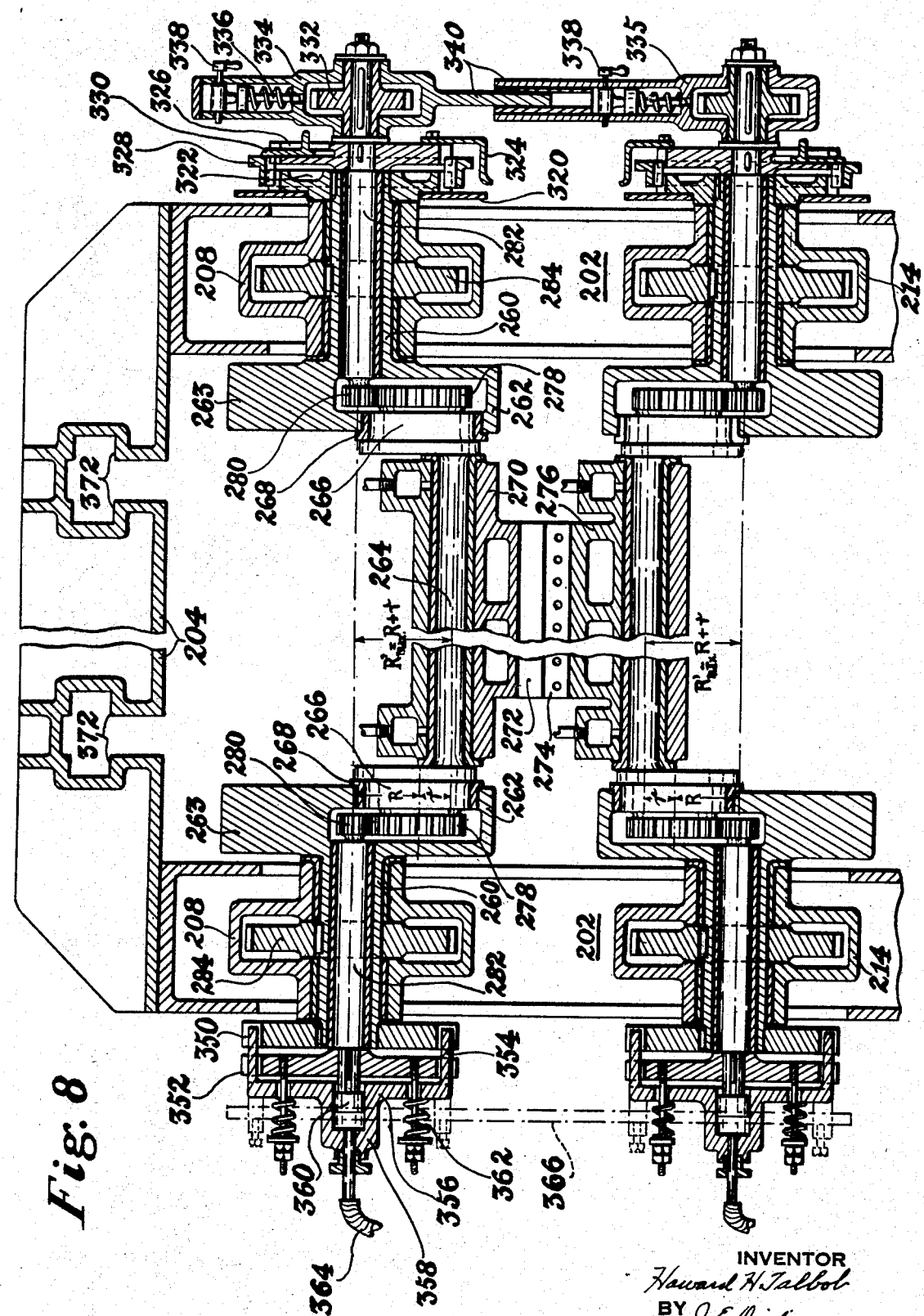

For a better understanding of my invention reference should be had to the accompanying drawings, wherein Fig. 1 is a horizontal sectional view of one embodiment of my invention as taken on line I—I of Fig. 2; Fig. 2 is an enlarged sectional view taken on line II—II of Fig. 1; Fig. 3 is a somewhat enlarged view taken on line III—III of Fig. 1; Fig. 4 is a sectional view taken on line IV—IV of Fig. 1; Fig. 5 is a vertical sectional view of the screw adjustment incorporated in the apparatus; Fig. 6 is a plan view of another embodiment of my invention; Fig. 7 is a sectional view on a somewhat larger scale as taken on the line VII—VII of Fig. 6; Fig. 8 is a sectional view taken on the line VIII—VIII of Fig. 7; Fig. 9 is a sectional view taken on the line IX—IX of Fig. 7; and Fig. 10 is a diagrammatic sectional view showing the material-stripping means incorporated in the apparatus.

In the embodiment of my invention shown in Figs. 1 to 5, the numeral 10 indicates generally a shear frame which includes corner posts 12 at the material-receiving side of the shear and corner posts 14 at the delivery side of the shear. The posts are connected together at their upper ends by cross-members 16. Journaled on the frame are a plurality of rollers 18 which are adapted to receive and support the material M in its passage through the shear, and associated with the frame are one or more material-feeding rollers 20 which are driven through a gear box 22 by a motor 24.

As best shown in Figs. 1 and 2, a pair of shear blades 26 and 28 are mounted for rotary movement above and below the path of movement of the material M. In the embodiment of the invention shown, the material M has been illustrated as square bars and the rollers 18 and 20 and the shear blades 26 and 28 are suitably notched to better hold and cut the material. It should be clearly understood, however, that the material M can be in the form of strips, sheets, or bars of substantially any cross section without interfering with the operation of my improved shear thereon. Usually the shear blades 26 and 28 and sometimes the rollers 18 and 20 are changed to best adapt the apparatus to operation on a particular material. The shear blade 26 is secured to a supporting head 30 which is rotatably carried upon a heavy pin 32 which is secured at its ends to cranks 34 each of which is formed with counterbalanced portion 36 and is secured to a short crank shaft journal 38 which extends through an eccentric opening 40 in a hub 42 rotatably carried in a housing 44.

In a like manner shear blade 28 is carried on a head 46 which is rotatably supported on a heavy pin 48 which is secured at its ends to cranks 50 having counterbalancing portions 52. Each crank 50 is secured to a short crank shaft journal 54 which extends through an eccentrically positioned opening 56 formed in a hub 58 rotatably carried in a housing 60.

As shown particularly in Figs. 2 and 3 each rotatable head 30 and 46 is provided with a vertically directed slide portion 64 which slidably surrounds a vertically extending rod 66 which is pivotally connected by a pin 68 with a cross-head block 70 which is carried in suitable guides 72 mounted on cross members 16 so that the cross-head block 70 may have sliding movement in the guides 72. It will be seen that the cross-head 70, the associated guide 72, the vertical rod 66, and the vertically extending slide portions 64 received on the rod 66 guide the heads 30 and 46 so that at all times the shear blades 26 and 28 are carried in a substantially vertically extending position during the rotation of the cranks 34 and 50, and thereby operate to make square or vertical cuts on the material.

The housings 44 and 60 which support the ends of the crank shaft journals 38 and 54, respectively, are each formed in pairs, as best seen in Fig. 3, and the pair of housings 44, which is connected by a strengthening cross-brace 76, is pivotally supported at its ends adjacent the material-receiving side of the frame on a shaft 78. The ends of the shaft 78 are preferably squared or are connected to rectangular blocks, and are received in vertically extending channels 80 formed in the corner posts 12. The squared ends associated with the shaft 78, which are received in the channels 80, are formed with suitably tapped vertically extending openings through which vertically directed screws 82 extend, the ends of the screws being journaled in the corner posts, as shown in Fig. 2. The screws 82 are adapted to be simultaneously rotated by a motor 84 operating through a worm and worm gear drive, indicated as a whole by the numeral 86.

In a like manner the housings 60 form a pair which is connected by a cross-member 88. The ends of the housings 60 adjacent the material-receiving side of the frame 10 are pivotally mounted upon a shaft 90 which is formed with squared ends or to which are secured rectangular blocks which are also received in the channels 80. The squared ends of the shaft 90 or the rectangular blocks associated therewith are formed with suitably tapped openings through which the screws 82 extend. From Fig. 2 it will be recognized that the portion of the screws 82 above the material or pass line are formed with threads in one direction, while the portions of the screws below the material or pass line are formed with threads of opposite hand. Thus, when the motor 84 is driven forward or back the shafts 78 and 90 supporting the ends of the housings 44 and 60, respectively, are moved together or apart to control the distance between the housings, and thus the distance between the shear blades 26 and 28 in their shearing operation.

The other or delivery ends of the housings 44 and 60 are likewise supported for movement together or apart, which provides for miscutting as hereinafter explained, and as best illustrated in Figs. 2 and 3 I provide for the desired support and movement of the housing ends adjacent the delivery side of the frame 10 by connecting the ends of the housings 44 with a shaft 94 to which is pivotally secured at or adjacent its ends a pair of connecting rods 96 which extend to a crank shaft 98 rotatably carried on suitable bracket supports 100. In a similar manner, the ends of the housing 60 are connected adjacent the delivery end of the frame 10 by a shaft 102 which pivotally carries near or adjacent its ends connecting rods 104 which extend to crank portions 106 of the crank shaft 98, which crank portions 106 are at 180° to the crank portions 108, to which the connecting rods 96 are secured. It will be seen that the rotation of the crank shaft 98 moves the delivery end of the housings 44 and 60 periodically together and apart and in order to control the exact speed of rotation of the crank shaft 98 it is connected through a change gear box, indicated as a whole by the numeral 112, to a source of driving power, as hereinafter more fully explained.

In order to rotate the cranks 34 and 50, the crank shaft journals 38 and 54 secured, respectively, to the cranks are connected at one side of the housings 44 and 60 with universal drive spindles 116 and 118 which are interconnected (see Fig. 3) by a suitable gearing, indicated as a whole by the numeral 120, so that the cranks 34 and 50 revolve at equal speeds but in opposite directions. The gearing 120 and thus the universal drive spindles 116 and 118 are connected in driving relation to a main drive shaft 122 which extends to a reduction gear box 124, in turn connected to a driving motor 126. In order to control the speed of the main drive shaft 122, the motor 126 may be provided with a speed control 127, or the gear box 124 can be of the variable speed type, or both controls can be provided. Preferably, the speed control 127 is synchronized with the motor 24 which is in turn synchronized with the speed of mill motors or other source from which the material is fed. When this is done the speed of the main drive shaft 122 is controlled by the provision of a variable speed gear box 124.

As heretofore stated, the crank shaft journal 38 connected to each crank 34 is supported in an eccentrically positioned opening 40 carried in the rotatable hub 42 journaled in the housing 44. This is a particularly important part of my inventive concept for the reason that I am able to change the radius of the cranks 34, and thus the speed of the shear blade 26 driven by the cranks without increasing or decreasing the number of revolutions per minute of the crank shafts. More particularly, this is achieved by not only rotating the crank shaft journal 38 and the crank 34 by mechanism heretofore described, but by simultaneously rotating each hub 42 at the same angular speed as its associated crank 34, so that each crank shaft journal 38, crank 34, and hub 42 turn as a unit and without any relative movement therebetween. In other words, the center of rotation of each hub 42 is the center of rotation of each crank 34 and the effective length or turning radius of the cranks can be adjusted by changing the eccentric relation of each crank and its associated hub.

In order to turn each hub 42 at the same angular speed its associated crank shaft journal 38 and crank 34 are turned, each housing 44, as shown in Fig. 1, is provided with an idler gear 130 which engages with a gear 132 formed on the periphery of the hub 42. Each idler gear 130 engages also with a gear 134 in each housing, which gears are carried upon a shaft 136 rotatably journaled in the pair of housings 44. The shaft 136 is connected through a universal drive spindle 138 to a gear box, indicated as a whole by the numeral 112 and as shown particularly in Fig. 4. In exactly the same manner, the housings 60 are each provided with an idler gear 130 which engages with a gear 132 formed on the periphery of each hub 58. Each idler gear 130 engages also with a gear 134 in each housing, which gears are carried upon a shaft 137 journaled in the pair of housings 60. The shaft 137 is connected through a universal drive spindle 139 with the main shaft 141 of the gear box 112 which box contains gears 143 whereby the shafts 136 and 137 are connected to rotate at the same angular speeds but in opposite directions, as shown in Fig. 4.

The shaft 141 of the gear box 140 rotatably carries a gear 142, which is connected through an idler gear 144 with a gear 146 carried upon the shaft 122. Splined to a lateral extension of the shaft 141 is a clutch member 148 which is adapted to be moved by an arm 150 and associated mechanism, indicated as a whole by the numeral 152, so that the clutch member 148 can be moved into driving relation with an associated clutch face 153 carried integrally with the gear 142. When the clutch member 148 is moved in the opposite direction it engages with a clutch member 154 which is connected through a reducing gear box 156 with a motor or other prime mover 158.

It will be understood that the relation of the gears 146, 144, 142, 143, 134, 130 and 132, which completes the drive from the shaft 122 to the rotary hubs 42 and 58, is such that the hubs are turned at the same angular speed as their associated cranks and crank shafts, which crank shafts are likewise driven from the shaft 122, it being assumed that the clutch member 148 is engaging with the associated clutch face 153 carried by the gear 142. The clutch member 148 is moved by the mechanism 152 into engagement with the clutch face 154 only when it is desired to change the effective radius of the cranks as hereinafter described.

The change gear mechanism, indicated as a whole by the numeral 140, and through which the crank shaft 98 is driven, is connected to the main drive shaft 122 by gears 166 and the change gear mechanism includes a plurality of pairs of mating gears 168, 170 and 172, of which only one set is connected at a time by means of shifting mechanism, indicated as a whole by the numeral 174. The relation of the gears 172 is such that the crank shaft 98 completes one revolution to each revolution of the main drive shaft 122. The relation of the gears 170 is such that the crank shaft 98 completes one revolution to every two revolutions of the main drive shaft 122. The relation of the gears 168 is such that the crank shaft 98 completes one revolution to every three revelations of the main drive shaft 122. It will be understood that any additional gear sets may be incorporated in the change gear mechanism 140 to provide higher ratios between the rotation of the crank shaft 98 and the main drive shaft 122.

In the operation of my improved flying shear as just described, the material M is fed into the shear frame and onto the material-supporting rollers 18 by the feed rolls 20 which are driven by the motor 24. It will be understood that the material M is usually received from a finishing or other mill and that the motor 24 is synchronized, by any known means, with the mill so that the feed rolls 20 feed the material through the shear at substantially the same speed as the material is fed from the mill. Now the speed of the material fed by the feed rolls 20 is known or determined from the speed of the motor 24 or the mill from which the material comes, and in order to prevent destructive impacts between the shear blades 26 and 28 and the material M, it is first necessary to adjust the shear so that the speed of the blades 26 and 28 is approximately the same as the speed of the material. This is achieved by changing the speed of the motor 126 by the speed control mechanism 127 or by varying the speed through the use of the gear box 124 or both. As heretofore stated, this is preferably done automatically by the speed control mechanism 127 driving the motor 126 in synchronism with the motor 24 or merely by the use of synchronous motors. In all events, once the blades 26 and 28 are driven at the same speed as the material M, the shearing thereof is accomplished smoothly and without impact. Now, the first adjustment which can be made to change the length of the pieces of material cut is by making the shear blades miss one or more cuts between actual cuts. It will be understood that, when the gears 172 of the change gear box 112 are mating, the crank shaft 98 and the main drive shaft 122 turn at the same speed, and that every time the shear blades 26 and 28 come around opposite each other they come into shearing relation with each other and with the material M because the crank portions 106 and 108 are in vertical alignment and thus the connecting rods 96 and 104 have pulled the delivery ends of the housings 44 and 60 into positions of closest proximity. However, when the gears 170 are shifted by the mechanism 174 into engagement instead of the gears 172, then the crank shaft 98 makes only one revolution to every two revolutions of the main drive shaft 122. This means that the delivery ends of the housings 44 and 60 are in positions of closest proximity only once in every two revolutions of the shear blades. Hence, a shearing cut will only be made every two revolutions of the main drive shaft 122. In the same manner, when the gears 168 are engaged, a shearing cut will be made only every three revolutions of the main drive shaft 122. Thus, by the miscutting mechanism just described, the length of the pieces of material M can be doubled or multiplied as desired.

If it is desired to provide pieces of material M cut between the limits afforded by the miscutting just described, then the effective radius of the cranks 34 and 50 is changed together with the speed of the main drive shaft 122. Specifically, if it is desired to shorten the length of the pieces cut, the main drive motor 126 is stopped and the clutch member 148 is thrown into engagement with the clutch face 154 and the motor 158 is energized to rotate the hubs 42 and 58 relative to the cranks 34 and 50, thereby to change the eccentric relation of the crank shafts 38 and 54 and the hubs. This relative movement to shorten the length of the pieces of material M cut is in the direction to shorten the effective radius of the cranks. Once the desired crank radius is obtained, the motor 158 is stopped and the clutch member 148 is moved back to engage the clutch face 153 which reconnects the hubs 42 and 58 for constant angular movement with the cranks 34 and 50. Now, the speed of the main drive shaft 122 is increased by altering the variable speed gear box 124 to again correlate the speed of the blades 26 and 28 with the speed of the material M, and the resulting cuts will produce pieces of shorter length. It will be recognized that when the blades 26 and 28 travel on a shorter radius but at the same speed as the material M, their circular path of travel will be shorter than when the same blades working on a longer radius and again traveling at the constant speed of the strip have to move through a longer circular path.

In the same way, but by decreasing the speed of rotation of the main drive shaft 122 while increasing the effective radius of the cranks 34 and 50, and thus the effective radius of the blades 26 and 28, the length of the pieces of material cut can be increased.

As shown in Figs. 1 and 3, I provide one of the hubs 58 with a dial 184 and to the crank shaft 54 I affix a pointer 182 whereby the relative angular relationship and thus the effective radius of the shear blades 26 and 28 can be readily determined. Where the material M is fed to the apparatus at always the same constant speed, or at a speed synchronized with the speed of the motor 126, the dial 184 may be calibrated in terms of length of material cut and the variable speed gear box 124 is provided with similar markings. Again, I may rely on the skill of the operator to correlate the several variables to obtain cuts of the length desired.

It should be particularly understood that the adjustments afforded in my apparatus by the miscutting mechanism and by the means for changing the effective radius of the shear blades permit me to cut the material into a plurality of pieces each of the desired length, the length being between any desired limits of minimum and maximum. In other words, the adjustments provided by the change of radius and the miscutting preferably overlap each other.

I have found that it is advisable to change the relative position of the housings 44 and 60 when the radius of the crank arms 36 and 50 is changed in order that the shear blades 26 and 28 engage to the proper extent. Accordingly, I provide gauge means, indicated as a whole by the numeral 180, associated with the motor 84 and worm and worm gear mechanism 86 which control the rotation of the screws 82, and thus the vertical clearance between the entrance or material receiving side of the housings 44 and 60. Such mechanism is marked in terms of the radius of the crank arms, and it will be understood that the motor 84 is operated to show on the indicating mechanism 180 the same radius as shown by the pointer 182 on the dial 184 and heretofore described.

As shown in Fig. 5, I may provide an adjustable connection between the screws 82 and the ends of the shafts 78 and 90 which support the entrance ends of the housings 44 and 60. This permits the independent vertical adjustment of each end of either of the shafts to compensate for unequal wear, inaccuracy in mounting, and to make repairs easier and quicker. Specifically, the ends of the shafts 78 and 90 instead of being squared and tapped to receive the screws 82, or connected to blocks which are tapped to receive the screws as hereinabove set forth, are connected to square blocks 191 which are slidably received in the vertically extending channels 80 formed in the corner posts 12. The blocks 191 are each formed with a vertically extending polygonal opening 192 which slidably receives a polygonal nut 193 having threaded engagement with the screw 82. The ends of the nut 193 extend out of the upper and lower ends of the block 191 and are threaded to receive adjusting and lock nuts 194. Thus by releasing the top nuts and tightening the bottom ones, or vice versa, the ends of the shafts 78 and 90, and accordingly the ends of the housings 44 and 60, can be adjusted vertically independently of each other.

Figs. 6 to 10 show a second embodiment of my invention in which a different mechanism is provided for changing the radius of rotation of the shear blades. Also, I have omitted the miscut mechanism from this form of my invention for the sake of simplicity of illustration, but it should be understood that such mechanism may be incorporated in this or in any other embodiment of my invention.

Particularly referring to Figs. 6 to 9, a stationary shear frame is provided which includes a base 200 carrying standards 202 rigidly connected by a top beam 204 to each other. A movable top frame and a movable bottom frame are pivotally mounted on the standards 202 and are arranged above and below the material M' (shown to be a strip). The movable top frame consists of two laterally spaced gear housings 208 connected and held together at the delivery end of the shear by the cross bar 210 (see Fig. 7), and at the receiving end by rotatably carried axle 212 that serves also as pivot axle mounting the movable top frame oscillatably on the standards 202 of the stationary shear frame. The movable bottom frame consists of two laterally spaced gear housings 214 connected by the stationary bar 216 and the rotatably carried axle 218 that constitutes a pivot axle mounting the movable bottom frame oscillatably on the standards 202 of the stationary shear frame.

The positioning of the movable frames around their pivot axles may be achieved in any of a plurality of ways but I have illustrated it as being effected by raising and/or lowering, respectively, four nuts 220 having trunnions 222 to which the forked ends of each of the top and bottom gear housings are pivotally connected by links 224 which are pivotally connected at 226 to the gear housings. Screws 228 having their top and bottom portions formed with threads of opposite hand are journaled in the shear frame and cooperate with the nuts 220. As best shown in Fig. 6, the turning of screws 228 is effected by means of keyed-on worm gears 230 driven by worms 232 fixed on a shaft 234 which is driven through meshing gears 236 and 238 by an electric motor 240. Thus the nuts 220 can be brought nearer or further away from the pass line of the shear positioning the moving frames about their pivot axles to occupy such positions in which the shear blades will properly meet at the end of the cut in the pass line. The motor 240 is provided with a cooperating and preferably magnetic brake 244 and a coacting limit switch 246, the latter automatically disenergizing the motor and energizing the brake after the maximum or set numbers of revolutions of the motor are made in either direction. The switch 246 and brake 244 are mounted on a base 247 rigidly attached to the top beam 204. Through gearing 248 a graduated dial 250 of an indicator 252 is positively driven by one of the threaded shafts 228, and a stationary pointer 254 associated therewith indicates the necessary adjustment of the movable frames according to the length cut by the shear.

As best seen in Fig. 8 in a somewhat larger scale, each of the gear housings 208 of the top movable frame journal a hollow crank shaft 260 to which are connected hollow crank arms 262 in turn provided with integral or fixed counterweight masses 263. The crank arms 262 carry a crank pin 264 having eccentric cylindrical end portions 266 turnably mounted in bushings 268 in suitable apertures of the crank arms 262. Rotatably mounted on the crank pin 264 is a carrier head 270 to which a shear blade 272 is rigidly fastened. A complementary or bottom shear blade 274 is carried by the carrier head 276 rotatably mounted on the lower blade crank pin and crank shaft assembly composed of the same elements and designated by the same characters as those of the upper blade crank shaft assembly.

It will be recognized that the effective turning radius of the shear blades and thus the horizontal speed equalization between the blades 272, 274 and the material can be achieved by turning the crank pins 264 and the connected eccentrics to any desired angle relative to the crank arms 262 and the hollow crank shafts 260. This is achieved by rigidly connecting gears 278 to the eccentrics, which gears mesh with pinions 280 provided on stub shafts 282 rotatably accommodated in the hollow crank shafts 260. Gears 284 keyed to the hollow crank shafts 260 within the housings 208 mesh with gears 286 (see Fig. 7) keyed on axle 212 in the upper movable frame and on axle 218, in the bottom movable frame, respectively. Axles 212 and 218 extend into a gear box 290 (see Fig. 6) and carry therein keyed-on meshing gears 292 and 294 of equal pitch-circle. Axle 218 extends beyond the gearbox 290 and carries a clutch 296, preferably of the magnetic type, which connects it positively and by remote electrical control to a drive shaft of a gearbox 298 driven by a main motor 300 through shaft 302 from which also pinch rollers 304 are driven by gears 306. Uprights 202 of the stationary shear frame have the necessary extensions to carry the pinch rolls 304 and also serve to support a lower guide or apron 305 and upper guide 307 for properly entering the material M' onto the shear blades. Apron 305 may be provided at its delivery end with springs 308 which are adapted to lift the leading end of the material M' and prevent its undue deflection.

Motor 300 is synchronized by known means (such as being constructed as a synchronous motor or having a regulator 309 connected to it, etc.) with the mill or other apparatus from which the material is conveyed to the shear so that pinch rolls 304 always have the proper delivery speed which substantially is equal to that of the mill or other associated apparatus. Gearbox 298 is adapted for the adjustment of the angular speed of the blade crank shafts for obtaining the desired variations in the frequency of the shearing positions of the blades respective to the unchanged delivery speed of the pinch rolls necessary for varying the lengths cut within the intended cutting range of the shear.

A second smaller motor 310 may be connected to one of the gears 292 through speed reducer 312, a non-slip and preferably magnetic clutch 314, mitre gears 316 and pinion 318 that meshes with the gear 292. This drive by motor 310, due to its great speed reduction, is utilized for the fine adjustment of the effective radii of rotation of crank pins 264, as hereinafter explained, during which drive clutch 296 is disconnected while during cutting operations the adjustment clutch 314 is disconnected and drive clutch 296 kept connected. The main motor 300 also may be used for adjustment of the crank arms where it is adapted to be operated relatively slowly.

As shown in Fig. 8, the stub shafts 282 rotate during operation of the shear together with the hollow crank shafts 260, to which they are locked by any suitable means so that there is no relative movement between pinions 280, gears 278, eccentrics 266 and bushings 268. Thus, each of the composite blade crank shafts turns as a rigid unit with a certain effective crank radius. In case the apparatus is adjusted by changing the speed ratio of the gearbox 298 between shaft 302 and axle 212 to cut the material M' to a different length, the effective crank radii of the composite crank shafts have to be correspondingly changed to equalize the blade speed with the material speed at the moment of the engagement, as previously explained. For such an adjustment of the effective crank arms, it is necessary to prevent the turning of the stub shafts 282 and turn the hollow crank shafts 260 relative to the stub shafts. When this is done, the eccentrics 266 are turned relative to crank arms 262 and the resultant crank pin radii are changed. This change is continued until a graduated indicator dial 320 attached to a toothed disc 322 keyed on hollow crank shaft 260 is turned sufficiently so that hands 324, fastened to a toothed disc 326 keyed on the stub shaft 282, point to the graduation corresponding to the adjusted length. A toothed ring 328, shiftably cooperating with toothed discs 322 and 326, and prevented by latch 330 from axial displacement, locks the toothed discs and the stub shafts 282 and hollow crank shafts 260 together during the shearing operation, while the unlocking for adjusting purposes is effected by moving latch 330 radially inwardly and shifting ring 328 axially out of engagement with disc 322.

For preventing the turning of each stub shaft 282 during adjustment of the blade radius, and as shown at the right side in Fig. 8, a gear 332 is keyed thereon, which gear is enclosed in a housing 334 in connection with the top crank shaft and a housing 335 cooperating with the bottom crank shaft, respectively. The housings 334 and 335 are pivotally mounted on the hubs of gears 332 and each housing contains a spring-retracted pawl 336 that may be pressed by hand levers 338 in between the teeth of the associated gear 332 locking it to the housing. Telescoping extensions 340 provided on the housings 334 and 335 prevent the housings from rotating but permit the gear housings 208 and 214, and thus the shear blades, to be moved to and from each other. By manually holding pawls 336 in locking positions relative to gears 332, the stub shafts 282 of both upper and lower blade crank shafts are prevented from turning. Such locking of only one stub shaft of each of the two blade crank shafts will suffice, due to the rigidity of the crank shaft mechanism, to prevent the other stub shafts 282 from turning. However, similar or other suitable arresting and locking means may be provided for the other stub shafts also and all of the arresting and locking means may be remote-controlled by known mechanical, pneumatic, magnetic, electric, or other apparatus, not shown.

I show in Fig. 8 on the left-hand side a somewhat different arrangement for preventing stub shafts 282 of both upper and lower crank shafts from turning during adjustment and for locking them to the hollow crank shafts during the normal shearing operation. A toothed disc 350 is keyed on each hollow crank shaft 260, and a toothed disc 352 is keyed and axially secured on each stub shaft 282. The discs 350 and 352 cooperate with the laterally protruding teeth 354 of a disc 356 connected to an hydraulic cylinder 358 having a plunger 360 which is attached to the end of the stub shaft 282. Springs 362 urge the teeth 354 of disc 356 in a direction to lock discs 350 and 352 and shafts 260 and 282 together, which is necessary during cutting operations. For adjustment of the effective crank-radii the hydraulic cylinders 358 are energized through their inlets 364 whereby teeth 354 are lifted out of the teeth of disc 350. To prevent the discs 356 from turning relative to each other, they are temporarily connected to each other in any convenient manner, e. g., by one or more bars 366 which are connected to suitable lugs on the discs, as shown in dot and dash lines.

For guiding the blade carriers so that the shearing edges move relative to each other in planes that are substantially vertical, both top and bottom carriers are provided with suitable lugs 367 (see Figs. 7 and 9) which slidably receive guide rods 368 which are pivotally mounted on rollers 370 guided by suitable tracks 372 in the upper beam 204 of the stationary shear frame. Guide rods 368, below the pass line of the material M', carry a stripping plate 374 which reciprocates horizontally together with the guide rods in harmonic relation to the rotary motion of the crank pins 264. As shown in Fig. 10, the leading edge of stripping plate 374 always will be somewhat behind the bottom blade 274 but will strip the material from the blade in case it is thin and has a tendency to stick to the blade as shown in dotted lines. The stripping plate 374 lifts the leading end of the cut thin material over an apron 376 and prevents its interference therewith. A suitable conveyor, e. g. an endless belt 378, helps to carry the material from the apron towards its destination.

From the foregoing description it will be recognized that the objects of my invention have been achieved by the provision of an improved flying shear which is relatively simple and rugged and which is capable of cutting substantially any type of moving material into pieces of substantially any desired length, all without destructive impacts.

Although I have specifically illustrated and described several embodiments of my invention, it should be understood that my invention is not limited thereto or thereby but is defined in the appended claims.

I claim:

1. The combination in a flying shear, means for moving elongated material through the shear, a pair of cooperating shear blades, means mounting the shear blades for rotary movement on opposite sides of the path of movement of the material, means comprising a member eccentrically mounted in an opening in the shear blade mounting means, means in the shear blade mounting means for rotating the member relative to the shear blade mounting means for changing the length of the radius of rotation of the shear blades, and means for rotating the shear blades at substantially the same speed as the speed of the material.

2. In combination in a flying shear, means for moving elongated material through the shear, a pair of cooperating shear blades, means mounting the shear blades for rotary movement on opposite sides of the path of movement of the material, means comprising a variable crank mechanism for changing the length of the radius of rotation of the shear blades, means for rotating the shear blades at substantially the same speed as the speed of the material, and automatic adjustable means to change the frequency of the cutting positions of the blades relative to the number of revolutions per minute of said blade mounting means to effect a miscut of the material when desired, the cutting blades being maintained substantially at right angles to the material.

3. In combination in a flying shear, means for moving elongated material through the shear, a pair of cooperating shear blades, means mounting the shear blades for rotary movement on opposite sides of the path of movement of the material, means comprising a variable crank mechanism for changing the length of the radius of rotation of the shear blades, means for rotating the shear blades at substantially the same speed as the speed of the material, means to change the frequency of the cutting positions of the blades relative to the number of revolutions per minute of said blade mounting means to effect a miscut of the material, and means for guiding the shear blades in their rotary movement so that they are always substantially at right angles to the plane of movement of the material.

4. In combination in a flying shear, means for moving elongated material through the shear, a pair of cooperating shear blades, means mounting the shear blades for rotary movement on opposite sides of the path of movement of the material, means comprising a variable crank mechanism for changing the length of the radius of rotation of the shear blades, means for rotating the shear blades at substantially the same speed as the speed of the material, means to change the frequency of the cutting positions of the blades relative to the number of revolutions per minute of said blade mounting means to effect a miscut of the material, other means for moving the blade mounting means apart to adjust the overlap of the shear blades in their cutting stroke, and means for guiding the shear blades in their rotary movement so that they are always substantially at right angles to the plane of movement of the material.

5. In combination in a flying shear, means for moving elongated material through the shear, a pair of cooperating shear blades, means mounting the shear blades for rotary movement on opposite sides of the path of movement of the material, means comprising a variable crank mechanism for changing the length of the radius of rotation of the shear blades, means for rotating the shear blades at substantially the same speed as the speed of the material, and means for moving the blade mounting means apart to adjust the overlap of the shear blades in their cutting stroke.

6. In combination in a flying shear, means for moving elongated material through the shear, a pair of cooperating shear blades, means mounting the shear blades for rotary movement on opposite sides of the path of movement of the material, means comprising a variable crank mechanism for changing the length of the radius of rotation of the shear blades, means for rotating the shear blades at substantially the same speed as the speed of the material, and means for guiding the shear blades in their rotary movement so that they are always substantially at right angles to the plane of movement of the material.

7. In combination in a flying shear, means for moving elongated material through the shear, a pair of cooperating shear blades, means mounting the shear blades for rotary movement on opposite sides of the path of movement of the material, means for rotating the shear blades at substantially the same speed as the speed of the material, means for guiding the shear blades in their rotary movement so that they are always substantially at right angles to the plane of movement of the material, and means associated with the guiding means for stripping the material from the shear blades after cutting.

8. In combination in a flying shear, means for moving elongated material through the shear, a pair of cooperating shear blades, means mounting the shear blades for rotary movement on opposite sides of the path of movement of the material, means for rotating the shear blades at substantially the same speed as the speed of the material, means for guiding the shear blades in their rotary movement so that they are always substantially at right angles to the plane of movement of the material, and means for stripping and guiding the material from the shear blades after cutting.

9. In combination in a flying shear, means for moving elongated material through the shear, a pair of cooperating shear blades, means mounting the shear blades for rotary movement on opposite sides of the path of movement of the material, means for rotating the shear blades at substantially the same speed as the speed of the material, means to change the frequency of the cutting positions of the blades relative to the number of revolutions per minute of said blade mounting means to effect a miscut of the material and means for maintaining the blades substantially at right angles to the material, and other means for moving the blade mounting means apart to adjust the overlap of the shear blades in their cutting stroke.

10. In combination in a flying shear, means for moving elongated material through the shear, a pair of cooperating shear blades, means mounting the shear blades for rotary movement on opposite sides of the path of movement of the material, and means comprising a variable crank mechanism for changing the length of the radius of rotation of the shear blades.

11. A flying shear including a shear blade, a crank arm carrying the shear blade, a crank shaft secured to the crank arm, a hub having an eccentric opening journaling the crank shaft, means rotatably supporting the hub, means for rotating the crank shaft and the hub at the same angular speed, means for rotating the crank shaft and hub relative to each other to adjust the eccentricity of the crank shaft and thus the radius of rotation of the crank arm, and means for changing the speed of rotation of the crank shaft and the hub when the radius of rotation of the crank arm is changed so that the actual speed of movement of the shear blade can be retained substantially constant.

12. A flying shear including a shear blade, a crank arm carrying the shear blade, a crank shaft secured to the crank arm, a hub having an eccentric opening journaling the crank shaft, means rotatably supporting the hub, means for rotating the crank shaft and the hub at the same angular speed, and means for rotating the crank shaft and hub relative to each other.

13. A flying shear including a shear blade, a crank arm having an opening therein, a member rotatably received in the opening, an eccentric connection between the member and the shear blade, a crank shaft connected to the crank arm, means for rotating the member relative to the crank arm to change the radius of rotation of the shear blade, means for rotating the crank shaft and crank arm without turning the member relative to the crank arm, and means for changing the speed of the last-named rotating means so that the speed of movement of the shear blade is substantially constant regardless of its radius of rotation.

14. A flying shear including a shear blade, a crank arm having an opening therein, a member rotatably received in the opening, an eccentric connection between the member and the shear blade, a crank shaft connected to the crank arm, and means for rotating the member relative to the crank arm to change the radius of rotation of the shear blade.

15. A flying shear including a shear blade, a crank arm having an opening therein, a member rotatably received in the opening, an eccentric connection between the member and the shear blade, a crank shaft connected to the crank arm, means for rotating the member relative to the crank arm to change the radius of rotation of the shear blade, and means for rotating the crank shaft and crank arm without turning the member relative to the crank arm.

16. In combination in a flying shear, a frame adapted to receive the material to be cut and guide it in a path therethrough, a pair of housings above the path of the material, a pair of housings below the path of the material, a shear blade rotatably supported by the upper pair of housings, a shear blade adapted to cooperate with the first-named blade and rotatably supported by the lower pair of housings, adjustable means for moving one end of each pair of housings away from the other pair of housings to effect a miscut of the material, means for changing the effective radius of rotation of the shear blades, means for moving the other ends of each pair of housings toward and from each other to compensate for a change in effective radius of rotation of the shear blades, and means for simultaneously rotating the shear blades in opposite directions and for operating the miscut means.

17. In combination in a flying shear, a frame adapted to receive the material to be cut and guide it in a path therethrough, a pair of housings above the path of the material, a pair of housings below the path of the material, a shear blade rotatably supported by the upper pair of housings, a shear blade adapted to cooperate with the first-named blade and rotatably supported by the lower pair of housings, adjustable means for moving one end of each pair of housings away from the other pair of housings to effect a miscut of the material, and means for simultaneously rotating the shear blades in opposite directions and for operating the miscut means.

18. In combination in a flying shear, a frame adapted to receive the material to be cut and guide it in a path therethrough, a pair of housings above the path of the material, a pair of housings below the path of the material, a shear blade rotatably supported by the upper pair of housings, a shear blade adapted to cooperate with the first-named blade and rotatably supported by the lower pair of housings, adjustable means for moving one end of each pair of housings away from the other pair of housings to effect a miscut of the material, and means for moving the other ends of each pair of housings toward and from each other.

19. Apparatus for cutting elongated material into predetermined lengths while it is moving comprising a pair of cooperating rotatable shear blades, means for rotating the blades, means for automatically synchronizing the normal speed of movement of the blades with the speed of movement of the material, means for changing the effective radius of rotation of the blades, means for returning the speed of movement of the blades to the speed of movement of the material after the effective radius of rotation of the blades has been changed, means driven in synchronism with the blades for effecting movement apart of the axes of rotation of the blades when it is desired to miss a cut by the blades, and means associated with the last-named means for changing the number of revolutions of the blades between miscuts thereof.

20. Apparatus for cutting elongated material into predetermined lengths while it is moving comprising a pair of cooperating rotatable shear blades, means for rotating the blades, means for automatically synchronizing the normal speed of movement of the blades with the speed of movement of the material, means comprising a variable crank mechanism for changing the effective radius of rotation of the blades, and means for returning the speed of movement of the blades to the speed of movement of the material after the effective radius of rotation of the blades has been changed.

21. In combination in a flying shear, means for moving elongated material through the shear, a pair of cooperating shear blades, means mounting the shear blades for rotary movement on opposite sides of the path of movement of the material, means comprising a variable crank mechanism for changing the length of the radius of rotation of the shear blades, indicating means associated therewith for determining the movement imparted thereto, means for rotating the shear blades at substantially the same speed as the speed of the material, means to change the frequency of the cutting positions of the blades relative to the number of revolutions per minute of said blade mounting means to effect a miscut of the material, other means for moving the blade mounting means apart to adjust the overlap of the shear blades in their cutting stroke, indicating means associated therewith for ascertaining the movement imparted to the blade mounting means, and means for guiding the shear blades in their rotary movement so that they are always substantially at right angles to the plane of movement of the material.

HOWARD H. TALBOT.